Patented July 13, 1926.

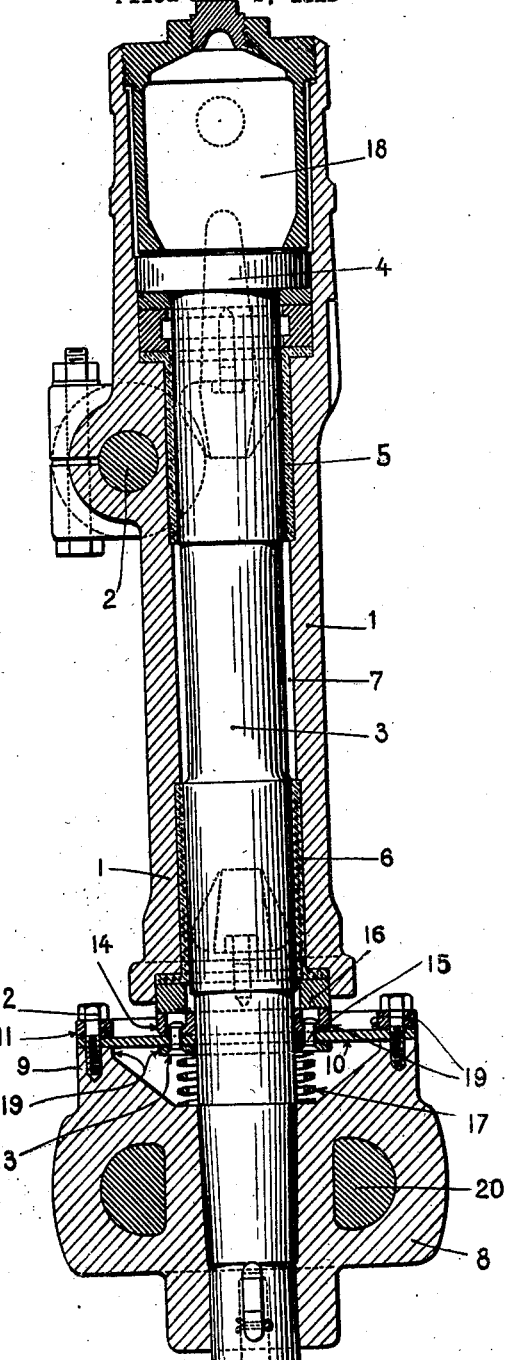

1,592,135

UNITED STATES PATENT OFFICE.

WALTER MERRITT COOK, OF LUDLOW, VERMONT, ASSIGNOR, BY MESNE ASSIGNMENTS, TO THE RAYMOND BROTHERS IMPACT PULVERIZER COMPANY, A CORPORATION OF ILLINOIS.

ROLLER MILL.

Application filed November 2, 1922. Serial No. 598,601.

The present invention relates to improvements in roller-mills. It relates more particularly, but not limitatively, to roller-mills, comprising a vertical shaft at the top of which is fixed a spider, each arm of which supports, by means of a horizontal axis, a bearing enclosing a vertical rotary shaft capable of oscillating relative to this shaft under the action of centrifugal force and known as a roller journal. The lower end of each roller journal carries a roller and all these rollers run upon the inner face of a grinding ring against which they are thrust by centrifugal force and against which they effect the grinding.

In apparatus of this kind, it has been noticed that the lubricant, such as grease, placed at the upper portion of the vertical bearing, effected satisfactory lubrication of the roller-journals but escaped at the lower portion so rapidly that the consumption of lubricant was excessive.

Furthermore, the lubricant became mixed with the material treated and this, in certain cases, constituted a prohibitive disadvantage.

It has been proposed to obviate these drawbacks by arranging a kind of stuffing box at the lower portion of the bearing where the shaft projects therefrom, but this measure did not give satisfactory results.

The present invention is intended to obviate these drawbacks. It consists in mounting upon the periphery of the roller, the face of which is recessed, an annular diaphragm, the inner edge of which is forced against a fixed portion of the bearing, a sliding joint being effected between this diaphragm and the fixed portion.

In order to make the joint, a helical spring is interposed between the recessed face of the roller and the diaphragm.

Another characteristic of the invention consists in the construction of the rollers. These latter are castings of a relatively considerable mass. The cylindrical face of these rollers requires to be hardened, but this operation is difficult to effect in practice, for the reason that, after hardening the outer surface, the inner mass of metal which has not been able to cool down, gives off heat to the hardened surface and, consequently, anneals it to such an extent that the hardening becomes insufficient and is not uniform. In order to obviate this drawback and, in accordance with the present invention, the rollers are cast around a non-metallic core composed, for example, of foundry sand, which is left in the body of the roller, and this core resists the propagation of heat from the centre towards the exterior.

The invention is represented diagrammatically and by way of example in the accompanying drawing, which is a section of a roller journal, its bearing and its roller. The bearing 1 oscillates about the axis 2 and contains the shaft 3. This latter is supported by a shoulder 4 and rotates in bushes 5, 6, between which a chamber 7 for lubricant is formed. The roller 8, keyed upon the lower extremity of the shaft 3, has a conical recess at its upper portion and has a circular flange 9. On this flange is fixed a diaphragm 10 which when seen in plan view has the form of a ring. The outer edge of the diaphragm is caused to bear against the flange 9 of the roller by a ring 11 held in place by screws 12.

The central periphery of the annular diaphragm 10 is clamped between two rings 13, 14 connected together by rivets 15. The ring 14 is held against the fixed ring 16 which is fixed to the bearing 1. The ring 14 is pressed against the ring 16 by a spring 17 interposed between the recessed portion of the roller 8 and the ring 13. This spring is not centered either at the top or at the bottom, so as to permit it to move laterally under the action of the strains to which it is subjected.

In operation, the lubricant placed in a lubricator 18 runs down between the bearing 1 and the shaft 3 and arrives at the cup, formed in the upper face of roller 8 by the flange 9. Once the cup is filled, the lubricant being projected by centrifugal force, rises along the conical cup of the roller 8 and forces the diaphragm 10 upwardly, thereby assisting the spring 17 in its action. The lubricant has no other issue than the joint between the rings 14 and 16 which are pressed one against the other, both by the spring 17 as well as by the centrifugal force exerted by the lubricant, to a sufficient extent to resist too rapid passage of the lubricant between them. The lubricant which, projected by centrifugal force, passes between the rings 14 and 16 prevents the material which has been finely ground in the apparatus from reaching the bearing surfaces between the shaft 3 and its bearings. In this way, damage to the latter is avoided. In order to permit of free movement of the diaphragm 10 during the running of the machine the edges of the various parts between which it is clamped are rounded off, as can be seen at 19.

The grinding rollers are parts whose superficial hardening presents certain difficulties in view of the mass of these rollers. Immediately after hardening the heat of the central portion radiates towards the surface and destroys the degree of hardness which had been obtained. In accordance with the present invention and with a view to obviating this drawback, there is placed in the mould used for casting the roller, a core (20) of material which is a non-conductor of heat, such as foundry sand, clay or the like, this core being left in the finished casting. After the hardening operation the core 20 prevents too rapid transmission of heat from the interior, towards the surface and thus permits of preserving the superficial hardening which has been obtained.

The invention has been described and shown merely by way of an example which is purely explanatory but in no way limitative, and it is obvious that the device could be modified, while at the same time remaining within the scope of the said invention as set forth in the appended claims.

I claim:

1. In a roller mill, the combination of a roller, a substantially vertical rotary shaft to the lower end of which the roller is secured, a bearing for the shaft, means for lubricating the bearing, and means operated by centrifugal force for preventing the escape of lubricant at the lower end of the bearing.

2. In a roller mill, the combination of a roller, a substantially vertical rotary shaft to the lower end of which the roller is secured, a bearing for the shaft, means for lubricating the bearing, and means operated by the centrifugal force of the lubricant for preventing its escape at the lower end of the bearing.

3. In a roller mill, the combination of a roller, a substantially vertical rotary shaft to the lower end of which the roller is secured, a bearing for the shaft, means for lubricating the bearing, and a substantially horizontal annular diaphragm, having its outer edge secured to the upper periphery of the roller, the inner portion of the diaphragm being held against the lower face of the bearing by the centrifugal force of the lubricant.

4. In a roller mill, the combination of a roller, a substantially vertical rotary shaft to the lower end of which the roller is secured, the roller having a lubricant receiving recess in its upper face surrounding the shaft, a bearing for the shaft, the lower end of the bearing extending adjacent to the recessed upper portion of the roller, means for lubricating the bearing, and a diaphragm enclosing the recess in the roller and secured to the periphery of the roller, the inner portion of the diaphragm surrounding the shaft and being held up in engagement with the lower face of the bearing.

5. In a roller mill, the combination of a roller, a substantially vertical rotary shaft to the lower end of which the roller is secured, the roller having a lubricant receiving recess in its upper face surrounding the shaft, a bearing for the shaft, the lower end of the bearing extending adjacent to the recessed upper portion of the roller, means for lubricating the bearing, and a diaphragm enclosing the recess in the roller and secured to the periphery of the roller, the inner portion of the diaphragm surrounding the shaft and being held up in engagement with the lower face of the bearing by the centrifugal force of the lubricant within the recess.

6. In a roller mill, the combination of a roller, a substantially vertical rotary shaft to the lower end of which the roller is secured, the roller having a lubricant receiving recess in its upper face surrounding the shaft, a bearing for the shaft, the lower end of the bearing extending adjacent to the recessed upper portion of the roller, means for lubricating the bearing, and a diaphragm enclosing the recess in the roller and secured to the periphery of the roller, the inner portion of the diaphragm surrounding the shaft, and a spring within the recess holding the inner portion of the diaphragm up in engagement with the lower face of the bearing.

7. In a roller-mill, the combination of a roller, a journal carrying said roller, a journal-bearing supporting said journal, means for lubricating said journal and means operated by the centrifugal force of the lubricant to prevent escape thereof between the roller and bearing.

8. In a roller-mill, the combination of a roller, a journal carrying said roller, a journal-bearing for supporting said journal, means for lubricating said journal, means operated by centrifugal force for preventing escape of the lubricant between the roller and journal bearing and a spring adapted to assist the action of the centrifugal force.

9. In a roller-mill, the combination of a roller, a shaft carrying said roller, a journal bearing supporting said shaft, a diaphragm fixed to the periphery of said roller and surrounding said shaft, means for lubricating said shaft, said diaphragm being forced against said journal bearing by the centrifugal force of the lubricant.

WALTER MERRITT COOK.